United States Patent [19]

Bauer

[11] Patent Number: 4,853,951
[45] Date of Patent: Aug. 1, 1989

[54] CORDLESS TELEPHONE WITH IN-RANGE MONITORING

[75] Inventor: Peter Bauer, Fürth, Fed. Rep. of Germany

[73] Assignee: U.S. Philips Corporation, New York, N.Y.

[21] Appl. No.: 133,700

[22] Filed: Dec. 16, 1987

[30] Foreign Application Priority Data

Dec. 17, 1986 [DE] Fed. Rep. of Germany ....... 3643004

[51] Int. Cl.$^4$ .............................................. H04Q 7/04
[52] U.S. Cl. ........................................ 379/62; 379/63
[58] Field of Search ....................... 379/61, 62, 63, 58; 455/127

[56] References Cited

U.S. PATENT DOCUMENTS

| | | | |
|---|---|---|---|
| 4,574,163 | 3/1986 | Zato | 379/62 |
| 4,700,375 | 10/1987 | Reed | 379/61 |

Primary Examiner—Robert Lev
Attorney, Agent, or Firm—David R. Treacy

[57] ABSTRACT

To verify that the handset of a cordless telephone unit is still within the radio coverage area of the fixed station, rather than attempt to establish connection with the switched network and verify contact as a result of receiving a dial tone, or dialing a special number in the network, a user can merely activate a radio coverage verification circuit in the handset and fixed station. Through use of these circuits, in addition to the identification number of the station, a code is transmitted. The identification and code, when received by the opposite station, are verified with number and code values stored in that station, and the number and code are then retransmitted as an acknowledgement signal. An annunciator in the handset provides a visual or aural warning to the user if the acknowledgement signal is not received, indicating that the handset is not within the radio coverage area of the fixed station.

3 Claims, 1 Drawing Sheet

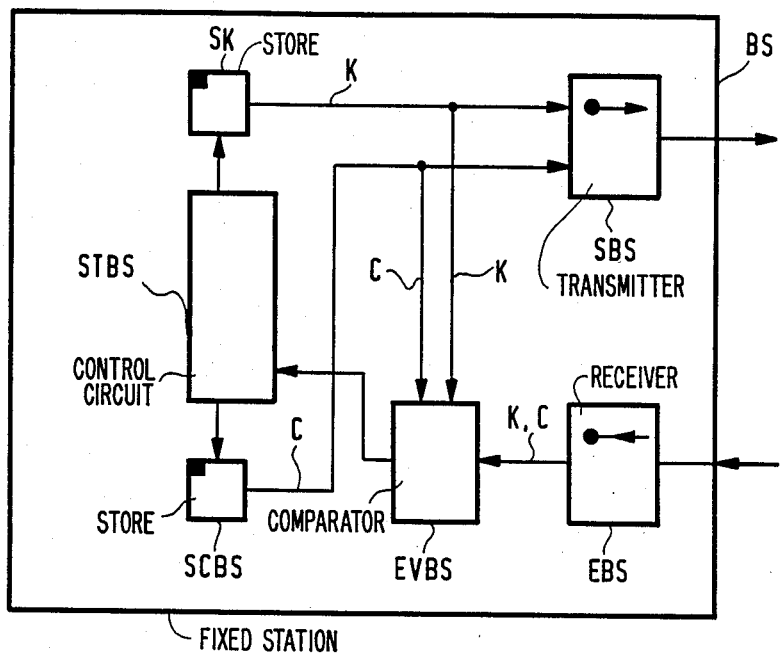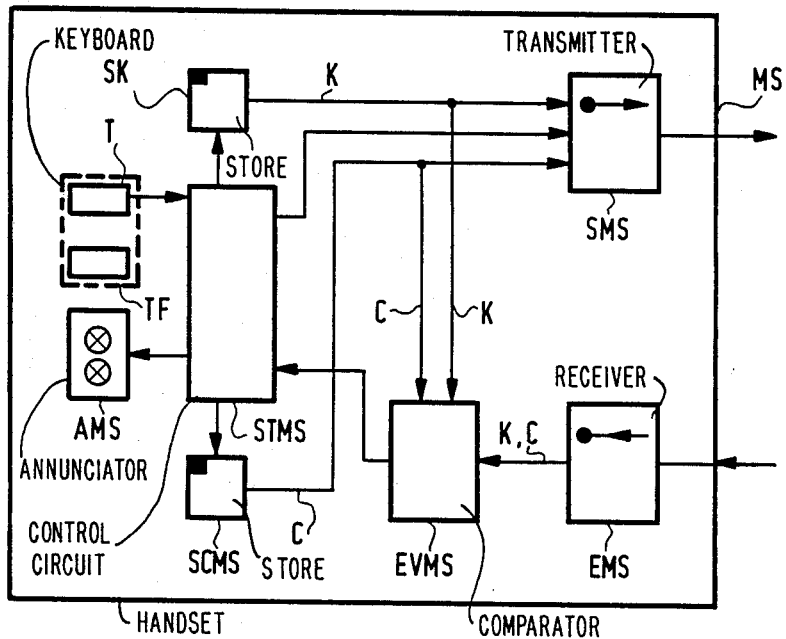

CORDLESS TELEPHONE WITH IN-RANGE MONITORING

BACKGROUND OF THE INVENTION

The invention relates to a cordless telephone unit for making and receiving calls over a telephone network; and more particularly to an improvement in such units which minimizes the cost and effort of verifying that the handset is within range of a fixed station.

The cord between a telephone set and the telephone network connection is generally several meters long. The cord between the handset or receiver and the telephone set, such a desk set or wall-mounted set, is still usually considerably shorter. Consequently, a user is bound to a certain spot while initiating a call, and can move only a short distance from that spot during the conversation.

Greater freedom is provided by so-called handsfree facilities, such as Speakerphone set having a loudspeaker and a sensitive microphone, enabling the user to move about freely for several meters in the room during a telephone conversation. However, it is still necessary to touch the fixed unit in order to initiate or receive a call.

To increase the user's range even more, cordless telephones are increasingly used in various countries. With these telephones, the transmission of information between a fixed station and a portable handset, together forming a cordless telephone unit, is effected through a pair of radio transmission channels, forming a duplex pair. The fixed station is connected via connector box to a main station or a private branch exchange, to provide access to the public telephone network. Since the fixed station and handset are connected to each other over radio transmission channels, the range of free movement is increased to as much as 200 meters or more from the associated fixed station or connector box.

In the Federal Republic of Germany there are 40 channels available for transmission of information, lying the 900 MHz. frequency range. In this frequency range, and with the limited transmission distance, the same radio channel is not apt to be seized by mutuallly adjacent cordless telephones. If a user wishes to initiate a call, and operates the "cradle switch" of the handset, or the fixed station receives a ringing signal over the network connection, then a station searcher which is part of the handset receiver, or part of the fixed station, will commence search for an idle radio channel in the assigned band, and upon finding such a channel will seize the duplex pair. To minimize the possibility that messages transmitted between the fixed station and handset of one cordless telephone can be overheard by another cordless telephone, to permit correct allocation of charges, and to ensure that the allocation of pairs of channels is unambiguous, an identification number is assigned to each cordless telephone independent of the subscriber's telephone number.

A method of searching for a radio channel and exchanging identification numbers, when a radio connection between handset and fixed station is set up, is further described and explained in European Patent Specification EP-B No. 10 074 940. According to this method, an idle transmission channel is seized by energizing the transmitter of the set from which communication is to be established, and a data packet containing the identification number is transmitted over the channel. This set then waits for an acknowledgement data packet, containing the same identification number to be transmitted by the corresponding opposite set. Upon receiving the identification number, on acknowledgement message, from the opposite station this number is compared by an arrangement in the initating station to is own identification number. If the two numbers are identical, the connection is switched through to the telephone network by a control arrangement, the exchange of identification numbers is stopped and the existing radio connection is monitored.

An article in ntz, Vol. 38 (1985), No. 7, pages 468-471, describes a cordless telephone system for the 900 MHz. frequency band. The automatic management of the 40 transmission channels is described on page 468. When the fixed station is in a rest position, all 40 channels are searched consecutively, to detect any request from a portable handset to establish a connection to the telephone network. The channels are searched cyclically, to determine if a tested channel is occupied; if it is not occupied, this channel is noted as idle, and the receiver switches to the next channel in the cycle.

Further monitoring, during the course of a conversation, is described on page 470 as an exchange of identification numbers which takes place every 15 seconds. During his exchange of numbers, speech transmission is interrupted for a short time interval, and the transmission of identification number can be heard softly during this interval.

Another method of monitoring a cordless telephone connection is described in Technische Mitteilungen PTT, No. 4, 1986, pages 152-165. In this monitoring method, identification numbers are exchanged to safeguard the assigning of the two stations. Monitoring is further described and explained at page 157: if the channel quality drops below a signal-to-noise ratio of 20 dB, for more than 500 ms., a user is informed by a warning tone emitted by the handset. If the receiving quality does not improve during the next 10 seconds, for example as a result of a change in the user's position, then the set automatically attempts to establish a new radio contact. After a connection has been set up, the identification number as described above is transmitted every 15 seconds and acknowledged automatically by the opposite station. If the acknowledgement signal contains an error twice within 35 seconds, or is not received, a new radio contact is again automatically attempted.

Operation of the systems described above, to establish connections and monitor transmission quality, presupposes that a connection has been made between the subscriber's fixed station and that telephone network. However, these systems do not provide a way for a user to verify whether he is still within the coverage area of the fixed station when the user moves a considerable distance while carrying the handset without utilizing the public telephone network or at least occupying a line selector.

SUMMARY OF THE INVENTION

An object of the invention is to provide a cordless telephone system in which a user can verify a simple manner whether he is still within radio coverage area, without necessarily establishing connection to the telephone network.

A further object is to provide this verification capability while keeping the cost of additional circuitry as low as possible.

According to the invention the cordless telephone unit includes a circuit in the handset, controllable by a user, for activating transmission of an identification number and a code; and the fixed station comprises a circuit for comparing the receive code with a code signal stored in the fixed station, and a response to an identity between the received code and the stored code signal, transmitting an acknowledgement signal to the handset to acknowledge receipt of the code.

According to one embodiment of the invention, upon receipt of the acknowledgement signal, the handset automatically renews radio contact with the fixed station.

According to another preferred embodiment, the handset has an annunciator which automatically produces a user-detectable sight or sound signal if an acknowledgement signal is not received following transmission of the identification number and code by the handset.

In a still further preferred embodiment of the invention, the handset includes user-controllable means for transmitting an identification number, to cause the fixed station to attempt to access a telephone network; and a user-controllable circuit for causing the handset to transmit an identification number and code for verifying that the handset is still within radio coverage area, without establishing connection to the telephone network. In this embodiment, upon receiving the identification number and code, and determination that the code matches a code signal stored in the fixed station, rather than accessing the telephone network the fixed station transmits an acknowledgement signal which comprises the same identification signal and code to the handset. The handset provides a warning signal to the user if the acknowledgement is not received.

BRIEF DESCRIPTION OF THE DRAWING

The sole FIGURE is a block diagram of the fixed station and handset circuits of a cordless telephone unit in accordance with the invention.

DESCRIPTION OF THE PREFERRED EMBODIMENTS

A cordless telephone unit is formed by a fixed station BS, including circuits for connection to a public telephone network (not shown), and a handset for sending and receiving messages over the telephone network via the fixed station.

The handset MS and fixed station BS each include a station searcher arranged as part of a respective receiver DMS and EBS, for selecting an idle radio transmission channel from a plurality of predetermined duplex pairs of radio transmission channels in response, respectively, to an attempt by a user to initiate a call from the handset, or receipt of a ringing signal by the fixed station from the telephone network. To establish radio contact between the fixed station and handset, the transmitter SMS or SBS in the respective portion of the unit, from which radio contact is to be initiated, transmits an identification number K over an idle radio transmission channel to the respected receiver EBS or EMS of the opposite station. This identification number K is stored in the respective identification number store SK arranged in the fixed station BS and in the handset MS. Receivers EMS and EBS are respectively connected to arrangements EVMS and EVBS, in the handset MS and fixed station BS, to scan and compare the identification number K received from the other station. When the identification numbers correspond, the connection to the public telephone network is switched through.

To enable the verification of radio contact, according to the invention the handset MS and fixed station BS each further include a respective code store SCMS and SCBS respectively controlled by control circuits STMS and STBS. Signals from the code stores are fed respectively to the arrangements EVMS and EVBS and the respective transmitters SMS and SBS.

To verify that he is within radio coverage area, without establishing a connection to the telephone network, a user depresses a switch key T in the handset MS. Upon receipt of the switch signal, the control STMS causes the handset transmitter SMS to transmit the identification number K and the code C through any automatically selected idle radio transmission channel to the receiver EBS of the fixed station. The identification number K and code signal C received in the fixed station are then compared in the arrangement EVBS with the stored values of K and C from the fixed station stores SCBS and SK. If the received number and code correspond to the stored number and code signal, a signal from the arrangement EVBS causes the control circuit STBS to initiate transmission by the transmitter SBS of the identification number K and the code C.

In the handset MS, the signals received by the signal EMS are provided to the arrangement EVMS for comparison of the received signals with the stored values of identification number K and code C. If these values do not correspond, or if no signal is received from the fixed station BS, an out of range signal is provided from the arrangement EVMS to the control STMS. An optical or acoustic signal is then produced by an annunciator AMS in the handset, to warn the user that the handset is not within the radio coverage area of the fixed station.

With the cordless telephone unit according to the invention, no battery power is wasted by unnecessary automatic attempts to verify radio coverage; but a user can at all times quickly and economically verify if the handset is still within range of the fixed station, so that the user will be able to be aware of and receive any incoming calls from the switched telephone network. With this circuit, the amount of battery power required to verify that the handset is within radio range, is less than that required if a user attempts to verify radio contact by seeking to obtain a dial tone from the network. Further, very little additional circuitry is required: an extra code store in each station of the unit, and an increased comparison and logic capability in the arrangements EVBS, EVMS and associated control circuits.

Verification according to the invention also obviates the possibility that an incoming call may be blocked from reaching the fixed station, because it is attempted to be placed at the same time that the user is verifying coverage. From the standpoint of the telephone utility, cordless units according to the invention further offer the advantage that line selectors will not be occupied by users merely seeking to determine if they still have radio contact with their fixed stations.

It will be clear that transmission of K+C signals and acknowledge signals can also be used automatically during the time a connection is established, to verify the channel quality.

What is claimed is:

1. A cordless telephone unit including a fixed station having means for accessing a telephone network, and a cordless, battery-powered handset, said handset comprising first means controllable by a user for transmitting an identification number, and means in the fixed station for receiving said identification number and, responsive to receipt of said number, for attempting to access said network, characterized by comprising second means in the handset, controllable by a user, for activating transmission of said identification number and a code, means in the fixed station for storing a code signal, means in the fixed station for receiving said identification number and code, and for comparing the received code with said stored code signal, and means in the fixed station, responsive to said means for comparing, for transmitting an acknowledgement signal to acknowledge receipt of said code without attempting to access said network.

2. A unit as claimed in claim 1, characterized in that said handset comprises an annunciator which produces a user-detectable signal if an acknowledgement signal is not received following transmission of said identification number and code.

3. A unit as claimed in claim 2, characterized in that said code signal is used as said acknowledgement signal.

* * * * *